(12) United States Patent
Jendrischik et al.

(10) Patent No.: US 10,337,556 B2
(45) Date of Patent: Jul. 2, 2019

(54) ROLLER FOR DEFLECTING OR GUIDING A METAL STRIP, WHICH IS TO BE COATED, IN A METAL MELT BATH

(71) Applicants: ThyssenKrupp Steel Europe AG, Duisburg (DE); thyssenkrupp AG, Essen (DE)

(72) Inventors: Gerd Jendrischik, Dinslaken (DE); Frank Matzken, Voerde (DE); Alfred Peitz, Oberhausen (DE); Michael Peters, Kleve (DE)

(73) Assignees: THYSSENKRUPP STEEL EUROPE AG, Duisburg (DE); THYSSENKRUPP AG, Essen (DE)

( * ) Notice: Subject to any disclaimer, the term of this patent is extended or adjusted under 35 U.S.C. 154(b) by 255 days.

(21) Appl. No.: 15/533,494

(22) PCT Filed: Oct. 29, 2015

(86) PCT No.: PCT/EP2015/075057
§ 371 (c)(1),
(2) Date: Jun. 6, 2017

(87) PCT Pub. No.: WO2016/091450
PCT Pub. Date: Jun. 16, 2016

(65) Prior Publication Data
US 2017/0343040 A1 Nov. 30, 2017

(30) Foreign Application Priority Data
Dec. 10, 2014 (DE) .................. 10 2014 118 316

(51) Int. Cl.
*B05C 3/12* (2006.01)
*C23C 2/00* (2006.01)
(Continued)

(52) U.S. Cl.
CPC .............. *F16C 13/02* (2013.01); *B05C 3/125* (2013.01); *C23C 2/003* (2013.01); *C23C 2/40* (2013.01);
(Continued)

(58) Field of Classification Search
CPC ....... C12C 2/002; C12C 2/40; F16C 2223/40; F16C 33/1065; F16C 33/106; F16C 33/107
See application file for complete search history.

(56) References Cited

U.S. PATENT DOCUMENTS 4,071,643 A * 1/1978 Pratt ........................ C23C 2/06
29/898.059
5,072,689 A * 12/1991 Nakagawa .............. C23C 2/003
118/419
(Continued)

FOREIGN PATENT DOCUMENTS

DE 195 11 943 A1 10/1996
DE 20006302 U 10/2001
(Continued)

OTHER PUBLICATIONS

International Search Report issued in PCT/EP2015/075057 dated Jan. 13, 2016 (dated Jan. 26, 2016).
(Continued)

*Primary Examiner* — Jason L Vaughan
(74) *Attorney, Agent, or Firm* — The Webb Law Firm

(57) ABSTRACT

A roller for deflecting or guiding a metal strip to be coated in a metal melt bath may include bearing journals disposed coaxially with one another for rotationally supporting the roller. To obtain a high coating quality while hot-dip coating the metal strip, in particular steel strip, and to increase the service life of such a roller, each bearing journal may comprise a plurality of axially spaced annular elevations that
(Continued)

have or are formed from a plain-bearing coating. The roller may comprise a steel roller shell, and each bearing journal may include a substantially cylindrical or circular-disk-shaped connecting steel portion that extends radially in the direction of the roller shell. At least one of the connecting portions may comprise a passage opening at an end face of the roller shell. The passage may be closed by means of a gas-permeable plug element comprised of ceramic material.

12 Claims, 3 Drawing Sheets

(51) Int. Cl.
    *C23C 2/40*     (2006.01)
    *F16C 13/02*     (2006.01)
    *F16C 33/10*     (2006.01)

(52) U.S. Cl.
    CPC ........ *F16C 33/109* (2013.01); *F16C 2240/42* (2013.01)

(56) References Cited

U.S. PATENT DOCUMENTS

| | | | | |
|---|---|---|---|---|
| 5,099,780 | A * | 3/1992 | Nappier | B05C 3/125 118/33 |
| 5,252,130 | A * | 10/1993 | Ookouchi | B22D 17/2023 118/419 |
| 5,571,327 | A * | 11/1996 | Ookouchi | C23C 2/003 118/423 |
| 5,667,310 | A * | 9/1997 | Oyagi | B05C 3/12 118/422 |
| 5,711,613 | A * | 1/1998 | Ookouchi | C23C 2/003 384/283 |
| 6,065,876 | A * | 5/2000 | Suhara | C04B 35/584 384/129 |
| 6,261,369 | B1 | 7/2001 | Morando | |
| 6,612,745 | B2 * | 9/2003 | Nishizaka | C23C 2/00 384/276 |
| 7,175,711 | B2 * | 2/2007 | Platzer | C23C 2/00 118/419 |
| 7,476,033 | B2 * | 1/2009 | Poloni | C23C 2/003 384/192 |
| 9,263,224 | B2 * | 2/2016 | Hunt | H01J 35/101 |
| 2003/0075105 | A1 | 4/2003 | Plaetzer | |
| 2003/0111777 | A1 * | 6/2003 | Morando | C23C 2/00 266/120 |
| 2007/0003176 | A1 * | 1/2007 | Poloni | C23C 2/003 384/418 |

FOREIGN PATENT DOCUMENTS

| | | |
|---|---|---|
| DE | 10 2004 032 324 B3 | 12/2005 |
| DE | 10 2007 045 200 A1 | 4/2009 |
| DE | 102011078878 A | 1/2013 |
| EP | 0292953 A1 | 11/1988 |
| EP | 0687746 A | 12/1995 |
| EP | 0864665 A1 | 9/1998 |
| EP | 2145845 A | 1/2010 |
| EP | 2743367 A | 6/2014 |
| WO | 2004065651 A | 8/2004 |
| WO | 2005031178 A | 4/2005 |
| WO | 2012136713 A1 | 10/2012 |

OTHER PUBLICATIONS

English language Abstract for EP 0292953 A1 listed above.
English language Abstract for DE 10 2004 032 324 B3 listed above.
English language Abstract for DE 10 2007 045 200 A1 listed above.
English language Abstract for DE 195 11 943 A1 listed above.

* cited by examiner

ROLLER FOR DEFLECTING OR GUIDING A METAL STRIP, WHICH IS TO BE COATED, IN A METAL MELT BATH

CROSS REFERENCE TO RELATED APPLICATIONS

This application is a U.S. National Stage Entry of International Patent Application Serial Number PCT/EP2015/075057, filed Oct. 29, 2015, which claims priority to German Patent Application No. DE 10 2014 118 316.9 filed Dec. 10, 2014, the entire contents of both of which are incorporated herein by reference.

FIELD

The present disclosure generally relates to rollers that can be used to deflect or guide a metal strip that is to be coated in a metal melt bath, including rollers that have coaxial bearing journals for rotationally supporting such rollers.

BACKGROUND

In the hot-dip coating of metal strip, in particular steel strip, the strip to be coated is fed through the molten metal by means of a deflection roller arranged in the melt bath. In addition, the portion of the strip emerging from the melt bath is usually guided by guide rollers (so-called "stabirollers", bottom rollers, stabilizing rollers or passline rollers) likewise arranged in the melt bath, in order to ensure a substantially vertical and oscillation-free passage of the strip through a gap defined by wiper nozzles. The wiper nozzles serve to wipe excess coating material from the strip and to regulate the layer thickness of the coating material adhering to the strip.

The defection rollers and guide rollers used in hot-dip coating units in the state of the art are designed as solid rollers, open shell rollers or closed hollow rollers.

Closed hollow rollers are still used today, but can only be operated with costly ventilation or venting systems, since with the closed roller cavity the high temperatures in the melt bath can lead to very high internal temperatures and even explosive failure of the roller, especially in the event of unwanted fluid inclusions in the roller cavity.

Since the deflection and guide rollers in the melt bath are not normally provided with their own drive, but are turned by the movement of the strip wrapping around them, the use of solid rollers is problematical, particularly in the hot-dip coating of thin strips. The high weight of solid rollers makes it harder for the strip to turn the rollers, particularly in the case of thin strips, which can lead to relative movements (slip) between the strip and the roller. This can cause scratches and other coating defects, which reduce the coating quality.

Shell rollers usually comprise a hollow cylindrical shell tube, which at both ends is connected to the bearing journals by spoke-like webs or openings, for example end plates having bored holes. Melt bath rollers in the form of shell rollers have the advantage that they are easier to turn than heavy solid rollers, and in contrast to the closed hollow rollers do not have an enclosed cavity, in which a critical internal pressure can occur. The end-face openings create a pumping effect, however, as the shell rollers rotate, giving rise to a turbulent material flow of molten metal in the area of the spoke-like webs and openings of the end plates, which leads to a very considerable material abrasion (wear) in the area of the webs and end plates. For this reason the service life of shell rollers used in hot-dip coating units is relatively low.

Common to the said design types of deflection and guide rollers is the fact that their pivot bearings usually take the form of plain bearings, wherein the bearing journals of the rollers (and those of the outer bearings receiving the bearing journals) are subject to severe wear influences. The high degree of wear of the bearing journals, typically made from steel, is mainly caused by the high bearing forces and the aggressive nature of the molten metal.

DETAILED DESCRIPTION

Figure 1:
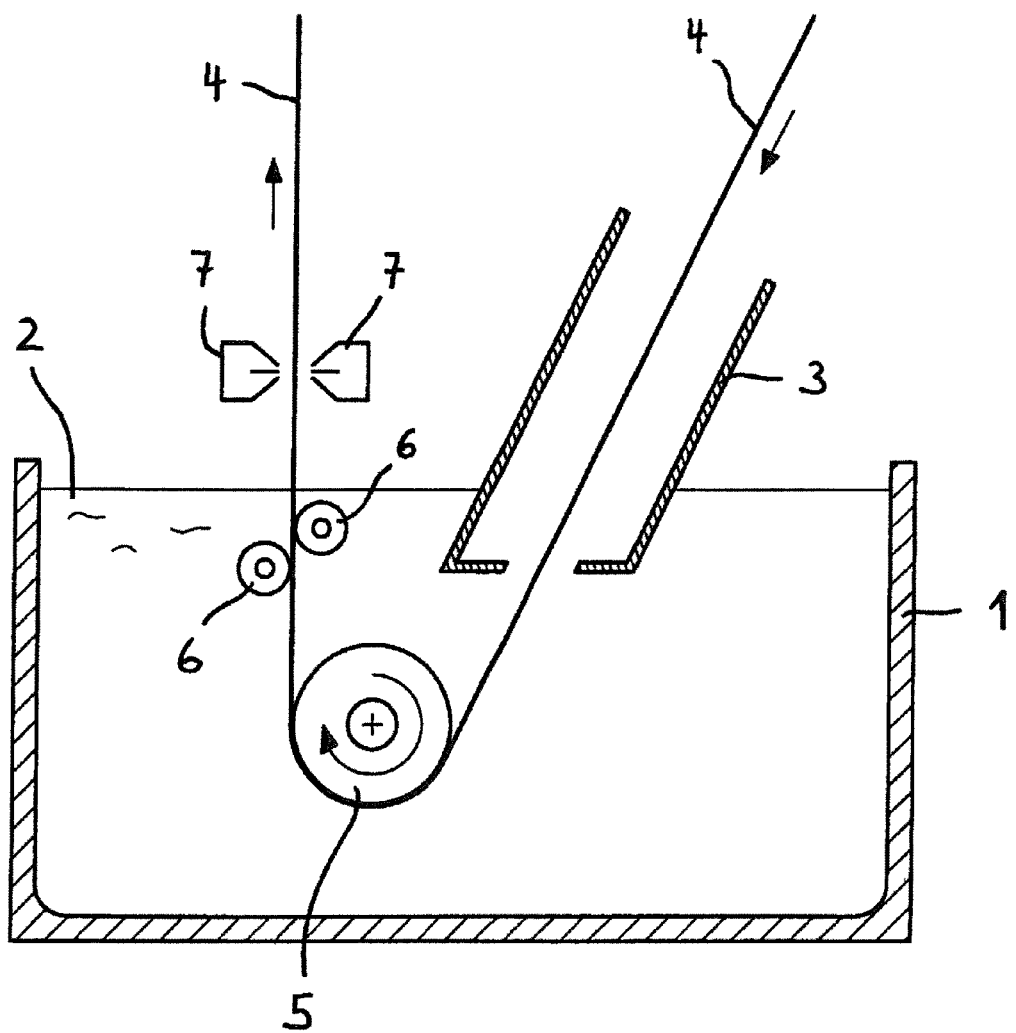
FIG. 1 is a schematic view of an example hot-dip coating facility.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting 'a' element or 'an' element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The present disclosure generally relates to a roller for deflecting or guiding a metal strip, which is to be coated, in a metal melt bath, having bearing journals arranged coaxially with one another for rotationally supporting the roller.

One example object of the present disclosure is to provide a roller that offers a comparatively long service life and that affords a high coating quality in the hot-dip coating of metal strip, in particular, steel strip.

This object may be achieved by the exemplary rollers disclosed below.

For its rotational support, the roller according to the invention is provided with bearing journals arranged co-axially with one another, wherein each bearing journal comprises a plurality of axially spaced annular elevations, which are provided with a plain-bearing coating or are formed from a plain-bearing coating.

During operation of the roller according to the invention, a sliding film of the metallic hot-dip coating material, which may be aluminum, or zinc or aluminum-based coating material, forms in the depressions situated between the annular elevations. In particular, during operation this forms a hydrodynamic lubricating cushion, which leads to reduction of the stress loading acting on the load-bearing surfaces of the rotational support. This relieving effect of the hydrodynamic lubricating cushion increases with the rotational speed of the bearing journal, so that the relieving effect is intensified as the rotational speed increases. This type of rotational support is therefore particularly suitable for immersed rollers used for the hot-dip coating of relatively thin metal strips, especially thin steel strips, which are to be fed through the melt bath at comparatively high strip speeds.

Tests conducted by the inventors in a hot-dip coating unit for the hot-dip aluminizing of steel strip have shown that the design of the bearing journals according to the invention is capable of at least doubling the service lives of deflection and guide rollers arranged in the melt bath, compared to the service lives of conventional deflection and guide rollers used hitherto.

The plain-bearing coating of the bearing journals designed according to the invention is preferably a molybdenum, tungsten and/or chromium-based plain-bearing coating. These afford good to very good sliding characteristics and a high wear resistance of the bearing journals of the melt bath roller.

According to a further preferred embodiment of the invention, the plain-bearing coating in the area of the annular elevations of each bearing journal of the melt bath roller is radially raised relative to a circumferential surface of the bearing journal by a dimension ranging from 0.1 mm to 1.0 mm, preferably ranging from 0.1 mm to 0.5 mm. This is a very reliable way of achieving the aforementioned hydrodynamic lubricating cushion and of minimizing a wearing effect of the metallic hot-dip coating material, which has penetrated into the depressions situated between the annular elevations, where it is intended to act as a sliding film.

A further advantageous embodiment of the invention is characterized in that the plain-bearing coating is introduced into annular grooves of the bearing journal, wherein the annular grooves are arranged between the annular elevations, and wherein the plain-bearing coating in the area of the annular grooves comprises annular depressions which are radially spaced in relation to the annular elevations. The surface structure of the bearing journal produced by the annular grooves improves the bonding of the bearing journal and slide coating. In particular, the annular grooves allow the annular elevations to be produced from the slide coating for a comparatively low slide coating material consumption, and at the same time allow the circumferential surface of the bearing journal to be provided with the slide coating also between the annular elevations, in order to protect the bearing journal there also against the wearing effect of the metallic hot-dip coating material, which gets into the area between the annular elevations. Moreover, where the plain-bearing coating is provided not only in the area of the annular elevations, but (optionally) also in the annular grooves of the bearing journal, the sliding characteristics of the bearing journal are improved. For this purpose the annular grooves are preferably formed in the bearing journal with a depth ranging from 0.05 mm to 0.4 mm.

In order to obtain a high coating quality in the hot-dip coating of metal strip, in particular steel strip, and to increase the service life of the melt bath roller, it is also advantageous, according to a further preferred embodiment of the invention, if the roller is formed as a roller of multicomponent material, in particular as a roller composed of two materials. In this case the roller comprises a roller shell, which is preferably made from steel, wherein a substantially cylindrical or circular-disk-shaped steel connecting portion, which extends radially in the direction of the roller shell, is provided on each bearing journal, wherein at least one of the connecting portions comprises at least one passage opening out at the end face of the roller shell, and wherein at least the one passage is closed by means of a gas-permeable plug element composed of ceramic material. The plug element here preferably terminates substantially flush with the outer end face of the cylindrical or circular-disk-shaped connecting portion.

The roller formed in this way corresponds to a shell roller inasmuch as its roller shell defines a cavity. This cavity may be void or gas-filled or preferably filled with a filler material, which has a lower density than that of the shell roller material. At least the one gas-permeable plug element in each case ensures that a critical internal pressure cannot build up in the cavity. Moreover, at least the one plug element prevents molten metal getting into the cavity and the pumping action usually occurring with conventional shell rollers. A distinguishing feature of the roller formed according to the preferred embodiment is a relatively low weight, compared to conventional solid rollers. This applies in particular to an embodiment in which the cavity defined by its roller shell is void or gas-filled, but also in the case of an embodiment in which this cavity is filled with filler material which has a lower density than that of the shell roller material. The relatively low weight of the roller means that it has good rotational characteristics when turned by the strip to be coated that lies against it, this being a prerequisite for a high coating quality of the strip. At the same time the relatively low weight of the roller relieves its rotational support, which is beneficial in achieving long roller service lives. Moreover, at least the one gas-permeable plug element, which prevents the aforementioned pumping action and the associated material wear, contributes to long roller service lives.

One problem in the hot-dip coating (so-called pot coating) of thin metal strip, particularly steel strip, are the unsatisfactory turning characteristics of the melt bath rollers, which can lead to slipping between the strip and the roller or even to a stoppage of the roller in the melt bath relative to the running strip deflected by the roller. Combining the bearing journals embodied according to the invention with the roller, preferably designed as a two-material roller or one of multicomponent material, produces a free-running roller with very good turning characteristics for the hot-dip coating of thin metal strip.

According to a further advantageous embodiment of the invention, the gas-permeable plug element may be of a constitution or composition such that it cannot be wetted by a non-ferrous metal-based molten metal, in particular an aluminum or zinc-based molten metal. This serves to exclude the possibility of molten material getting into the plug element and thereby largely to prevent a reduction of the gas-permeability of the plug element.

In a further advantageous embodiment of the invention the passage closed by the plug element narrows from the inside outwards, wherein the plug element is correspondingly formed and axially fixed in the passage. This embodiment affords an easy way, in production engineering terms, of reliably securing the plug element in position.

A further advantageous embodiment of the invention is characterized in that one or more filler elements composed of ceramic material are arranged in the space defined by the roller shell. The filler element(s) reduce or fill the void defined by the roller shell, so that the volume of gas contained in the roller cavity is correspondingly reduced or minimized. This is a very reliable way of excluding the risk of a critical internal pressure occurring in the roller. Although the filler element(s) of ceramic material give the roller designed according to the aforementioned embodiment a greater overall weight compared to a conventional shell roller having a relatively large gas volume, the increase in weight can be limited through the use of relatively lightweight ceramic material. For example, the filler element(s) may be made from calcium silicate-based ceramic material, preferably from fine-pored and/or carbon fiber-reinforced calcium silicate ceramic. The gross density of a filler element used in the roller according to the invention is preferably less than 900 kg/m³. For example, it may range from 800 to 850 kg/m³.

According to a preferred embodiment of the roller according to the invention, its overall density preferably ranges from 0.8 times to 1.2 times, preferably 1.0 times to 1.1 times the density of the molten metal used, for example an aluminum or zinc-based molten metal. The bearing forces caused by the weight of the roller are therefore relatively small. The overall weight of the roller according to the invention is preferably considerably less than the overall weight of solid rollers made of steel.

According to a further preferred embodiment of the roller according to the invention, the outer end face of each connecting portion of the roller shell and the bearing journal is provided with a protective coating, for example a protective coating of aluminum-zirconium oxide. This embodiment is capable of achieving a further reduction in roller wear caused by the aggressive molten metal and a further increase in the service lives of the roller.

The hot-dip coating facility represented schematically in FIG. 1 comprises a melt bath vessel 1, which is filled with a molten metal 2, for example an aluminum or zinc-based molten metal. A steel strip 4 to be coated is fed into the molten metal 2 via a funnel 3 immersed into the molten metal 2. A deflection roller (so-called immersion or pot roller) 5, which serves to deflect the steel strip 4 out of the running direction directed obliquely downwards into an upwardly directed, preferably substantially vertical running direction, is arranged in the melt bath vessel 1. Also arranged in the melt bath vessel 1 are one or two guide rollers (so-called stabilizer rollers or "stabirollers") 6, which serve to suppress oscillations of the steel strip 4 and thereby ensure the most accurate possible running of the strip 4 in relation to a wiper device 7. The wiper device removes excess coating material from the surface of the coated steel strip 4 and for this purpose comprises wiper nozzles 7 in the form of flat-spray nozzles, typically operated with compressed air or inert gas.

Figure 2:
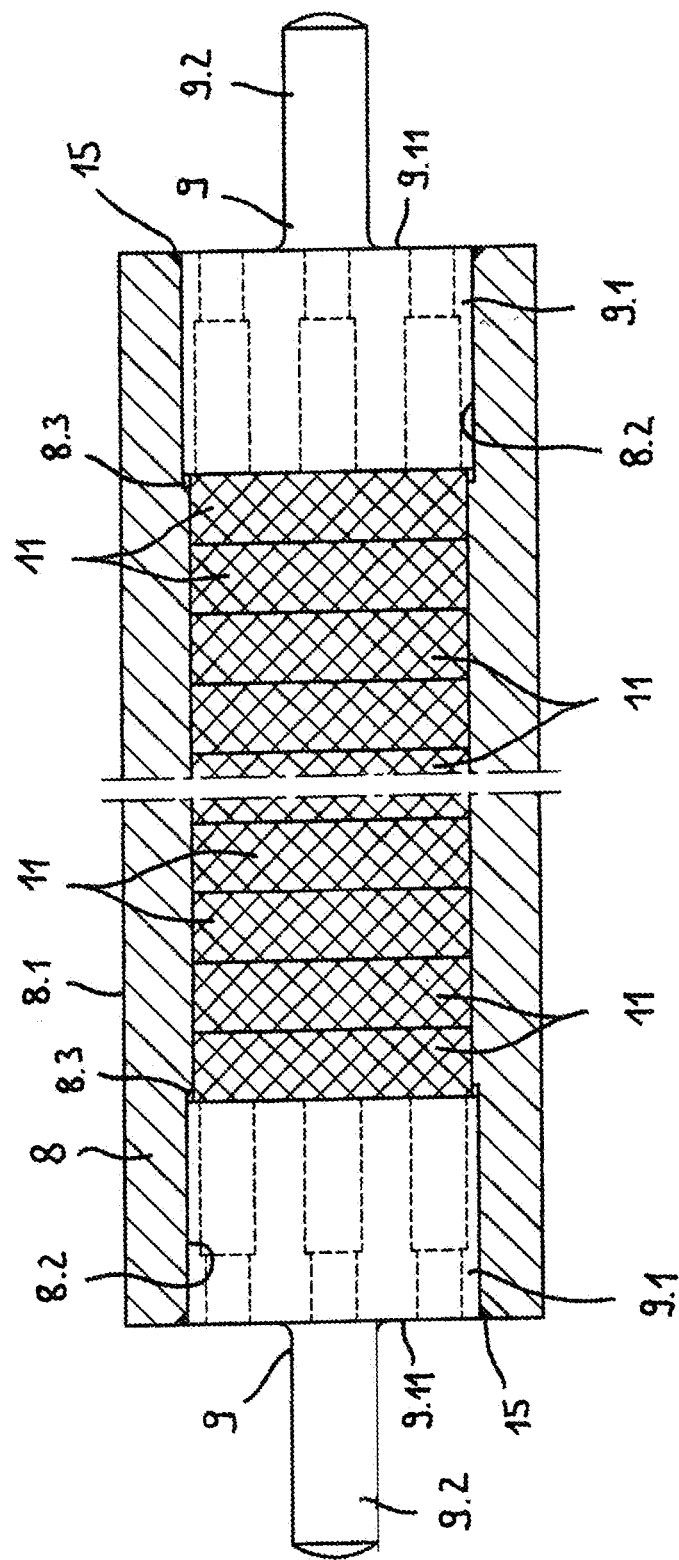
FIG. 2 is a sectional view of an example roller that is positionable in a melt bath of a hot-dip coating unit.
Figure 3:
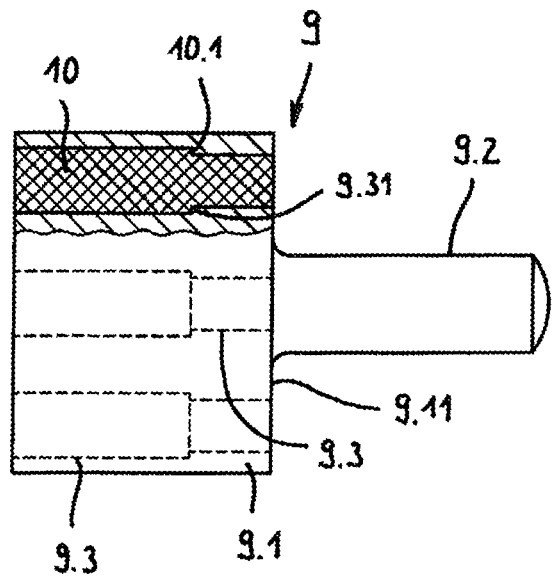
FIG. 3 is a sectional view of an example bearing journal of the roller of FIG. 2 in an axial representation wherein a portion is partially cut away.
Figure 4:
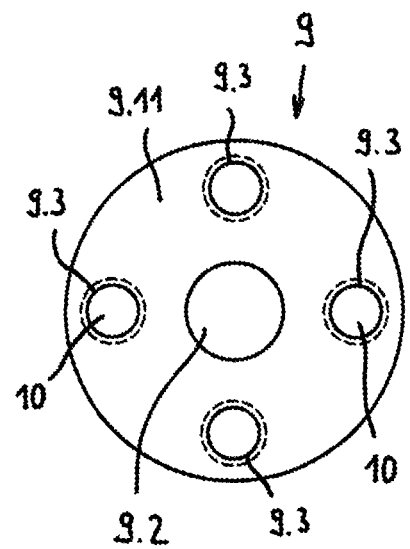
FIG. 4 is an end face view of the example bearing journal of FIG. 3.
Figure 5:
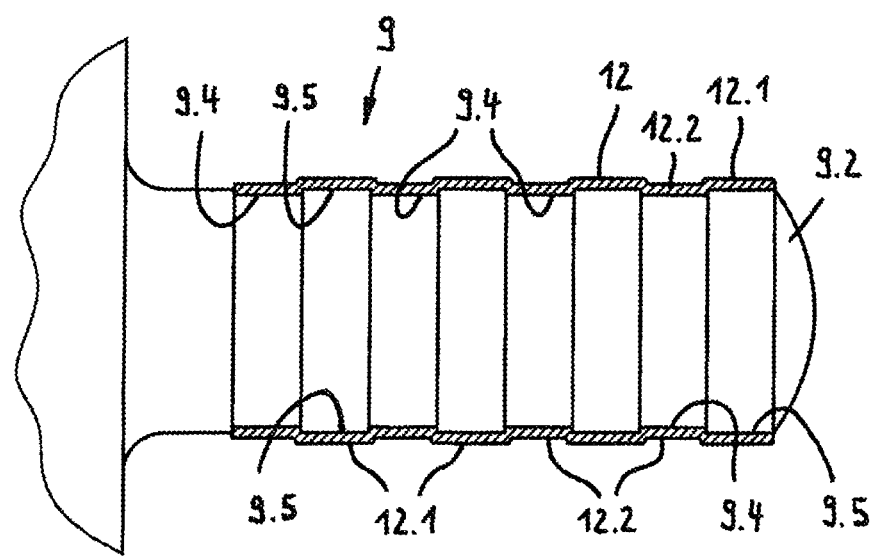
FIG. 5 is an axial sectional view of another example bearing journal of a roller.

The deflection roller 5 and/or at least one guide roller 6 are of a construction which is represented by way of example in FIGS. 2 to 4. The roller 5 or 6 comprises a roller shell 8 composed of steel, for example chromium-molybdenum steel. The roller shell 8 is of tubular design. The circumferential surface 8.1 of the roller here may be of cambered design, so that the outside diameter of the roller 5 or 6 diminishes from the center towards the ends of the roller.

Bearing journals 9 arranged coaxially with one another, which are likewise made of steel, for example chromium molybdenum steel, are arranged at the ends of the roller shell 8. Each bearing journal 9 comprises a substantially cylindrical or circular-disk-shaped connecting portion 9.1. The connecting portion 9.1 is preferably integrally formed with the journal part 9.2 projecting axially at the end face of the roller shell 8. The connecting portion 9.1 extends radially from the journal part 9.2 or the axis of rotation of the roller 5 or 6 in the direction of the roller shell 8. At its ends the roller shell 8 has inner faces 8.2 of wider diameter, which each define a circumferential internal step 8.3. The connecting portions 9.1 of the bearing journals 9 are pushed into the wider-diameter internal portions of the roller shell 8, forming a positive inlock, and are fixedly connected thereto by annular weld seams 15.

The outside diameter of the journal part 9.2 of the bearing journal 9 is smaller than the outside diameter of the roller shell 8 by a factor ranging from 3.0 to 7.0, preferably 4.0 to 5.0. The use of a bearing journal 9 having a correspondingly small journal diameter (diameter of the journal part 9.2) is preferred, since the journal part 9.2 then forms less resistance to rotation and the roller 5 or 6 is therefore easier to turn.

The connecting portion 9.1 of each bearing journal 9 has at least one or—as can be seen from FIGS. 2 to 4—more passages 9.3, which open out at the end face of the roller shell 8 and on the inner side of the connecting portion 9.1 or the bearing journal 9. In the exemplary embodiment shown, for example, four passages 9.3, which run substantially parallel to one another and are arranged uniformly spaced on a common graduated circle, are provided in each connecting portion 9.1 or bearing journal 9. As a modification to this exemplary embodiment, the connecting portion 9.1 or bearing journal 9 may also have fewer or more than four passages 9.3. According to the invention each passage 9.3 is closed by a gas-permeable plug element (insert) 10 composed of ceramic material.

The plug element 10 is produced on a calcium-silicate base, for example, preferably from a fine-pored calcium silicate ceramic. Calcium-silicate ceramic can be wetted only slightly, if at all, by non-ferrous molten metals such as AlSi molten metals or zinc-based molten metals. To increase its strength, the ceramic material of the plug element 10 may contain reinforcing fibers, for example carbon fibers.

Each passage 9.3 is preferably formed as a bored hole. In each case it has a step 9.31, so that it narrows from the inside outwards. The bolt-shaped plug element 10 is correspondingly formed and therefore likewise has a step 10.1 and can therefore be axially fixed in the passage 9.3. In the assembled state the plug element 10 terminates substantially flush with the outer end face 9.11 of the connecting portion 9.1 of the bearing journal 9 (cf. FIGS. 2 and 3).

The end face 9.11 of each connecting portion 9.1 may be provided with a protective coating, for example an aluminum-zirconium oxide-based protective coating.

The cavity of the roller 5 or 6 defined by the roller shell 8 and connecting portions 9.1 of the bearing journals 9 is preferably filled with one or more filler elements 11 composed of ceramic material. In the exemplary embodiment represented in FIG. 2 a plurality of circular disk-shaped filler elements 11 are arranged in series in the roller shell 8. The filler elements 11, for example, are made from the same material as the plug elements (ceramic inserts) 10. The cavity of the roller 5 or 6 between the connecting portions 9.1 is preferably filled substantially in its entirety with the disk-shaped filler elements 11. The ratio between the outside diameter and the inside diameter of the roller shell 8 ranges from 1.2 to 2.0, for example, preferably lying in the range from 1.4 to 1.6. The overall density of the roller 5 or 6 ranges, for example from 0.8 times to 1.2 times, preferably 1.0 times to 1.1 times the density of the molten metal 2 used, which in particular may be an aluminum or zinc-based molten metal.

The axially projecting journal part 9.2 of the bearing journal 9 is provided with a plain-bearing coating 12. The plain-bearing coating 12 is preferably made from molybdenum. In addition or alternatively it may also contain tungsten and/or chromium.

The plain-bearing coating 12 is of banded formation. It comprises a plurality of axially spaced annular elevations (bands) 12.1. For this purpose the material of the plain-bearing coating 12 is introduced into correspondingly spaced annular grooves 9.4 of the bearing journal 9 and/or applied to annular elevations 9.5 of the bearing journal 9. The grooves 9.4, for example, have a depth ranging from 0.05 mm to 0.4 mm. The layer thickness of the plain-bearing coating 12 is formed substantially uniformly over its axial extent. Accordingly, the surface structure of the bearing part 9.2 defined by the annular grooves 9.4 stands out in the circumferential surface of the plain-bearing coating 12. Molten metal may collect and form a sliding film in the depressions 12.2 of the plain-bearing coating 12 situated between the annular elevations 12.1.

The embodiment of the invention is not limited to the exemplary embodiments represented in the drawing. Rather, further variants are feasible which, with due modification, also make use of the invention specified in the claims. Thus, for example, the plain-bearing coating 12, slightly raised relative to the circumferential surface of the bearing journal 9, may also take the form of annular, axially spaced elevations 12.1, which are formed on a substantially cylindrical bearing journal having no grooves 9.4. Alternatively, the plain-bearing coating 12 may also be introduced only into the annular grooves 9.4 and at the same time be radially slightly raised relative to the annular elevations 9.5 of the bearing journal 9.

What is claimed is:

1. A roller for deflecting or guiding a metal strip to be coated in a metal melt bath, the roller comprising bearing journals that provide rotational support for the roller and are positioned coaxially with one another, wherein each of the bearing journals comprises axially-spaced annular elevations that either have or are formed from a plain-bearing coating, wherein the plain-bearing coating in an area of the axially-spaced annular elevations is radially raised relative to a circumferential surface of each of the bearing journals, wherein each of the bearing journals comprises a steel connecting portion that is substantially cylindrical or circular-disk-shaped and extends radially in a direction of the steel roller shell, and wherein at least one of the steel connecting portions comprises a passage opening at an end face of the steel roller shell, the passage being closed by a gas-permeable plug element comprised of ceramic material.

2. The roller of claim 1 wherein the plain-bearing coating is at least one of molybdenum-based, tungsten-based, or chromium-based.

3. The roller of claim 1 wherein the plain-bearing coating in the area of the axially-spaced annular elevations is radially raised to the circumferential surface by 0.1 mm to 1.0 mm.

4. The roller of claim 1 wherein the plain-bearing coating in the area of the axially-spaced annular elevations is radially raised to the circumferential surface by 0.1 mm to 0.5 mm.

5. The roller of claim 1 wherein the plain-bearing coating is disposed in annular grooves of each of the bearing journals, wherein the annular grooves are disposed between the axially-spaced annular elevations, wherein the plain-bearing coating in the area of the annular grooves comprises annular depressions that are radially spaced relative to the axially-spaced annular elevations.

6. The roller of claim 5 wherein each of the annular grooves has a depth of 0.05 mm to 0.4 mm.

7. The roller of claim 1 wherein the gas-permeable plug element has a composition such that the gas-permeable plug element cannot be wetted by an aluminum-based molten metal or by a zinc-based molten metal.

8. The roller of claim 1 wherein the passage narrows from an inside outwards, wherein the gas-permeable plug element corresponds to and is axially fixed in the passage.

9. The roller of claim 1 further comprising a filler element of ceramic material disposed in a space defined by the steel roller shell.

10. The roller of claim 1 wherein an outer end face of each of the steel connecting portions includes a protective coating.

11. The roller of claim 1 having an overall density of 0.8 to 1.2 times a density of a molten metal of the metal melt bath.

12. The roller of claim 1 having an overall density of 1.0 to 1.1 times a density of a molten metal of the metal melt bath.

* * * * *